US011698352B2

(12) United States Patent
Yamamoto et al.

(10) Patent No.: US 11,698,352 B2
(45) Date of Patent: Jul. 11, 2023

(54) X-RAY FLUORESCENCE SPECTROMETER AND CONTROL METHOD FOR X-RAY FLUORESCENCE SPECTROMETER (71) Applicant: Rigaku Corporation, Akishima (JP)

(72) Inventors: Yoshihisa Yamamoto, Takatsuki (JP); Yasujiro Yamada, Takatsuki (JP); Shinya Hara, Takatsuki (JP)

(73) Assignee: RIGAKU CORPORATION, Tokyo (JP)

( * ) Notice: Subject to any disclaimer, the term of this patent is extended or adjusted under 35 U.S.C. 154(b) by 0 days.

(21) Appl. No.: 17/633,558

(22) PCT Filed: Mar. 24, 2021

(86) PCT No.: PCT/JP2021/012325
§ 371 (c)(1),
(2) Date: Feb. 7, 2022

(87) PCT Pub. No.: WO2021/256041
PCT Pub. Date: Dec. 23, 2021

(65) Prior Publication Data
US 2022/0349847 A1 Nov. 3, 2022

(30) Foreign Application Priority Data
Jun. 15, 2020 (JP) ................. 2020-103349

(51) Int. Cl.
*G01N 23/223* (2006.01)
*G01N 23/2209* (2018.01)

(52) U.S. Cl.
CPC ....... *G01N 23/2209* (2018.02); *G01N 23/223* (2013.01)

(58) Field of Classification Search
CPC ............. G01N 23/2204; G01N 23/223; G01N 2223/076; G01N 35/04; G01N 21/6428;
(Continued)

(56) References Cited

U.S. PATENT DOCUMENTS

2002/0052695 A1   5/2002  Arake et al.
2002/0186812 A1*  12/2002 Sumii ................. G01N 23/223
                                                        378/44
(Continued)

FOREIGN PATENT DOCUMENTS

CN    102954972 A    3/2013
CN    110088603 A    8/2019
(Continued)

OTHER PUBLICATIONS

International Search Report dated Jun. 8, 2021, relating International Patent Application for PCT/JP2021/012325 with English translation pp. 1-4.
(Continued)

*Primary Examiner* — Don K Wong
(74) *Attorney, Agent, or Firm* — Hea Law PLLC (57) ABSTRACT Provided are an X-ray fluorescence spectrometer and a control method for an X-ray fluorescence spectrometer which are capable of preventing deterioration and breakage of a sample, and contamination of an inside of an apparatus even when an abnormality occurs in the X-ray fluorescence spectrometer. The X-ray fluorescence spectrometer includes: a measuring unit including: a moving mechanism configured to move a sample between a standby position and a measurement position; an X-ray source; a detector; and a first control unit; and an information processing unit including: an analysis unit; and a second control unit configured to control the measuring unit by communicating with the first control unit, the first control unit including retreat controller configured to perform retreat control for causing the moving mechanism to retreat the sample present at the measurement position to the standby position when communication between the first control unit and the second control unit is interrupted.

5 Claims, 8 Drawing Sheets

(58) Field of Classification Search
CPC ........... G01N 2223/1016; G01N 21/31; G01N 2223/304; G01N 33/00; G01N 1/44; G01N 11/10; G01N 11/14; G01N 23/083; G01N 23/22; G01N 2035/00306

See application file for complete search history.

(56) References Cited

U.S. PATENT DOCUMENTS

| | | |
|---|---|---|
| 2013/0034204 A1 | 2/2013 | Matoba et al. |
| 2014/0029721 A1 | 1/2014 | Niwa et al. |
| 2019/0302041 A1 | 10/2019 | Sako |

FOREIGN PATENT DOCUMENTS

| | | |
|---|---|---|
| JP | 2002139504 A | 5/2002 |
| JP | 2002310955 A | 10/2002 |
| JP | 2007240353 A | 9/2007 |
| JP | 2009097906 A | 5/2009 |
| JP | 2010217020 A | 9/2010 |
| JP | 2014145693 A | 8/2014 |
| JP | 2014185939 A | 10/2014 |
| JP | 2015203648 A | 11/2015 |
| WO | 2015029144 A1 | 3/2015 |

OTHER PUBLICATIONS

Office Action dated Aug. 26, 2022, for corresponding CN Patent Application No. 202180004650.1 with partial English translation, pp. 1-7.

Office Action of dated Mar. 28, 2023, for corresponding CN Patent Application No. 202180004650.1 with partial English translation, pp. 1-11.

* cited by examiner

X-RAY FLUORESCENCE SPECTROMETER AND CONTROL METHOD FOR X-RAY FLUORESCENCE SPECTROMETER

CROSS REFERENCE TO RELATED APPLICATIONS

This application is a National Stage of International Application No. PCT/JP2021/012325 filed on Mar. 24, 2021, which claims priority from Japanese Patent Application 2020-103349, filed on Jun. 15, 2020. The contents of the above document is incorporated herein by reference in its entirety.

TECHNICAL FIELD

The present invention relates to an X-ray fluorescence spectrometer and a control method for an X-ray fluorescence spectrometer.

BACKGROUND ART

Hitherto, there has been widely used an X-ray fluorescent spectrometer for performing qualitative and quantitative analysis of an element included in a sample by detecting fluorescent X-rays generated from the sample irradiated with primary X-rays. In the X-ray fluorescence spectrometer, bulk-shaped solid samples and samples of liquid, powder, and various forms are arranged in a sample chamber, and a sample is irradiated with primary X-rays generated by an X-ray source.

Analysis of a sample requires a certain amount of time, and an abnormality may occur in the X-ray fluorescence spectrometer during the analysis. For example, in Patent Literature 1, there is disclosed an X-ray fluorescence spectrometer for, when power is restored even after a power failure occurred at some midpoint of an analysis operation, returning the analysis operation to an operation that was being performed at the time of the occurrence of the power failure.

CITATION LIST

Patent Literature

[PTL 1] JP 2002-139504 A

SUMMARY OF INVENTION

Technical Problem

When an abnormality occurs in an X-ray fluorescence spectrometer, there is a fear that a sample being analyzed may continue to be irradiated with X-rays. In such a case, there is a fear that a bulk-shaped sample may be burnt or cracked. In addition, a liquid or powder sample is usually measured by being placed in a sample holder covered with a thin resin film, but there is a fear that, when X-rays are continuously applied for a long period of time, the film may be damaged and the sample may be scattered. When the sample is scattered, the inside of the X-ray fluorescence spectrometer is contaminated.

The present invention has been made in view of the above-mentioned problems, and an object thereof is to provide an X-ray fluorescence spectrometer and a control method for an X-ray fluorescence spectrometer which are capable of preventing deterioration and breakage of a sample and contamination of the inside of an apparatus even when an abnormality occurs in the X-ray fluorescence spectrometer.

Solution to Problem

According to claim 1, there is provided an X-ray fluorescence spectrometer including: a measuring unit including: a moving mechanism configured to move a sample between a standby position and a measurement position; an X-ray source configured to irradiate the sample with primary X-rays; a detector configured to measure an intensity of entering fluorescent X-rays; and a first control unit configured to control operations of the moving mechanism and the X-ray source; and an information processing unit including: an analysis unit configured to analyze the sample based on the intensity of the fluorescent X-rays measured by the detector; and a second control unit configured to control the measuring unit by communicating with the first control unit, the first control unit including retreating means for performing retreat control for causing the moving mechanism to retreat the sample present at the measurement position to the standby position when communication between the first control unit and the second control unit is interrupted.

According to the X-ray fluorescence spectrometer of claim 2, in the X-ray fluorescence spectrometer of claim 1, the second control unit is configured to transmit to the first control unit a confirmation signal to be used for confirming whether the communication is being performed normally at a predetermined time interval, and, when the confirmation signal has not been continuously received for a predetermined time, the first control unit is configured to determine that the communication has been interrupted, and to perform the retreat control.

According to the X-ray fluorescence spectrometer of claim 3, in the X-ray fluorescence spectrometer of claim 1 or 2, the first control unit includes cut-off means for performing cut-off control for cutting off the primary X-rays emitted from the X-ray source when the communication is interrupted.

According to the X-ray fluorescence spectrometer of claim 4, in the X-ray fluorescence spectrometer of any one of claims 1 to 3, the first control unit includes: discharging means for performing discharge control for discharging an atmosphere from a sample chamber for measuring the sample to place the measurement position under a measurement environment; and introducing means for performing introduction control for introducing the atmosphere into the sample chamber when the communication is interrupted.

According to claim 5, there is provided a control method for an X-ray fluorescence spectrometer, the X-ray fluorescence spectrometer including: a measuring unit including: a moving mechanism configured to move a sample between a standby position and a measurement position; an X-ray source configured to irradiate the sample with primary X-rays; a detector configured to measure an intensity of entering fluorescent X-rays; and a first control unit configured to control operations of the moving mechanism and the X-ray source; and an information processing unit including: an analysis unit configured to analyze the sample based on the intensity of the fluorescent X-rays measured by the detector; and a second control unit configured to control the measuring unit by communicating with the first control unit, the control method including the steps of: confirming whether communication between the first control unit and the second control unit has been interrupted; and performing retreat control for causing the moving mechanism to retreat the sample present at the measurement position to the standby position when it is confirmed that the communication has been interrupted.

Advantageous Effects of Invention

According to the inventions of claims 1 to 5, it is possible to prevent deterioration of the sample and contamination of the inside of the apparatus even when an abnormality occurs in the X-ray fluorescence spectrometer.

DESCRIPTION OF EMBODIMENTS

Now, a preferred embodiment for carrying out the present invention (hereinafter referred to as "the embodiment") is described with reference to the accompanying drawings. In this embodiment, a case in which an X-ray fluorescence spectrometer 200 is a wavelength-dispersive X-ray fluorescence spectrometer is described as a main example, but the X-ray fluorescence spectrometer 200 may be an energy-dispersive X-ray fluorescence spectrometer.

Figure 1:
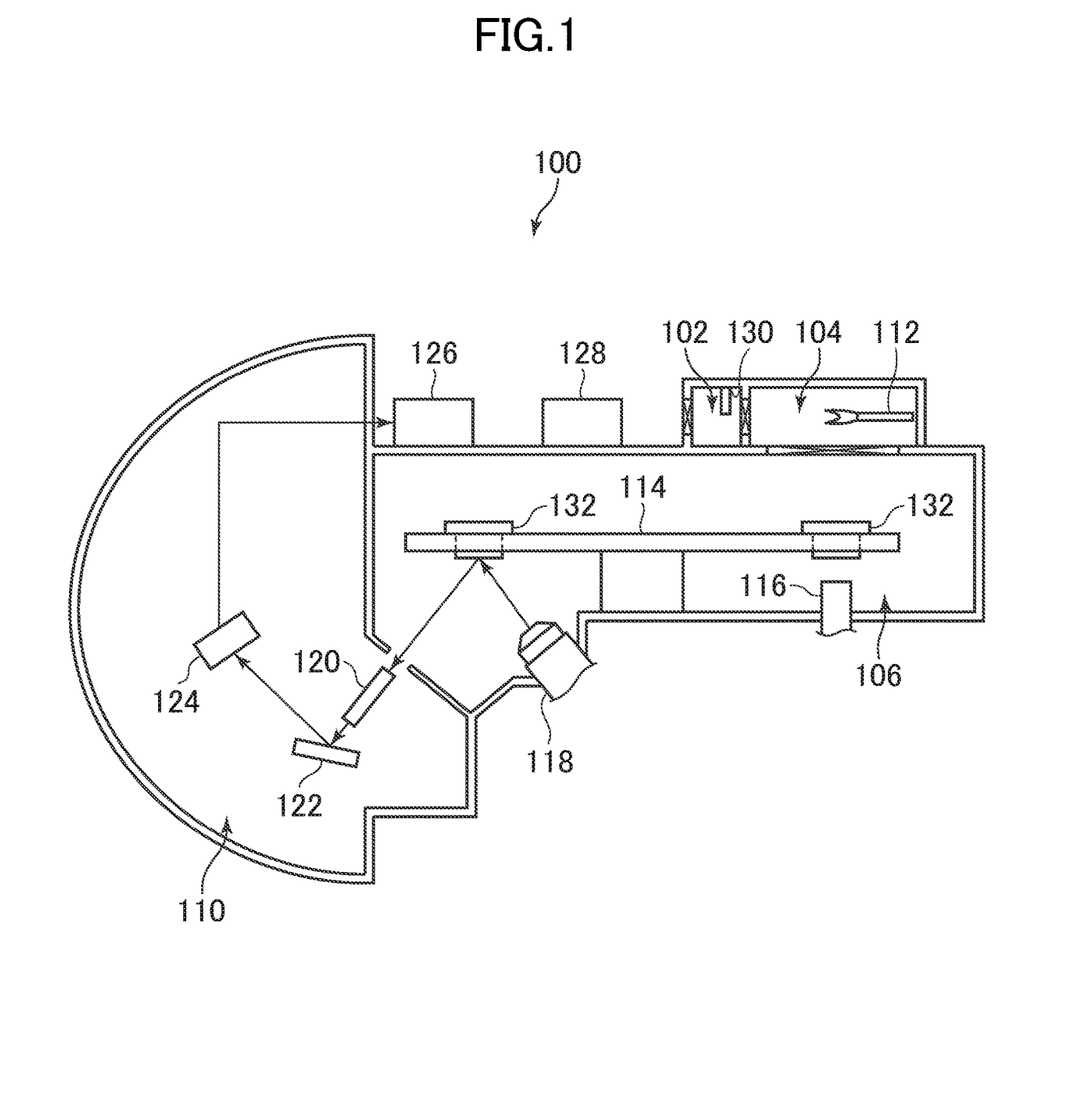
FIG. 1 is a diagram for illustrating an outline of an example of a measuring unit in an embodiment of the present invention.
Figure 2:
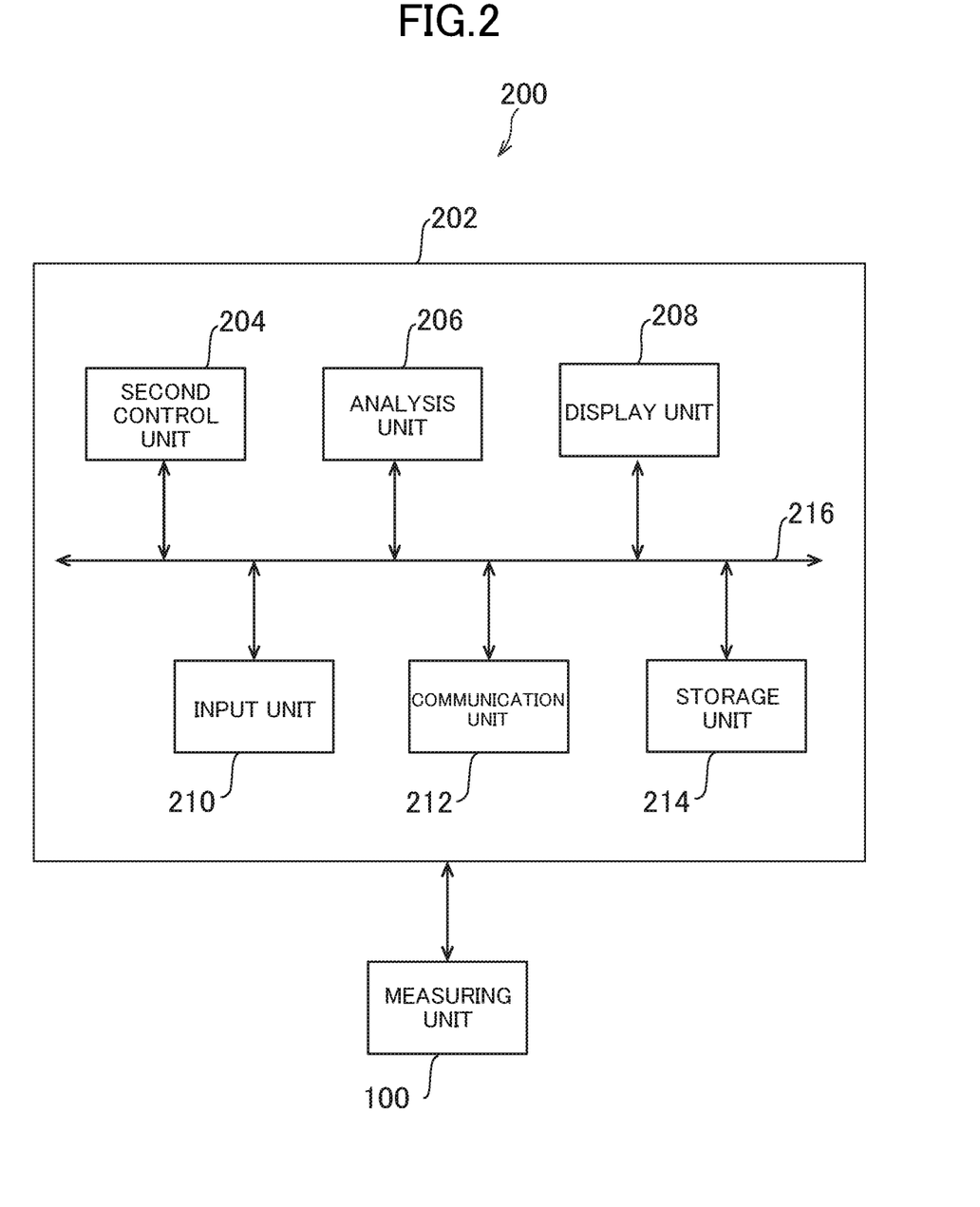
FIG. 2 is a diagram for illustrating an outline of an example of an X-ray fluorescence spectrometer according to the embodiment of the present invention.

The X-ray fluorescence spectrometer 200 according to the embodiment of the present invention includes a measuring unit 100 and an information processing unit 202. FIG. 1 is a diagram for illustrating an outline of an example of the measuring unit 100, and FIG. 2 is a diagram for illustrating an outline of an example of the X-ray fluorescence spectrometer 200. FIG. 1 is an illustration of the measuring unit 100 included in the X-ray fluorescence spectrometer 200 of a tube-below optics type in which a lower surface of a sample 132 is irradiated with primary X-rays.

As illustrated in FIG. 1, the measuring unit 100 includes compartments of a standby chamber 102, a preliminary exhaust chamber 104, a sample chamber 106, and a spectroscopic chamber 110. Shutters are provided between the standby chamber 102 and the preliminary exhaust chamber 104 and between the preliminary exhaust chamber 104 and the sample chamber 106, and each compartment is sealed so that gas does not leak when the shutter is closed. A partition wall that transmits X-rays therethrough may be provided between the sample chamber 106 and the spectroscopic chamber 110 so that the spectroscopic chamber 110 is sealed by the partition wall. The measuring unit 100 also includes a moving mechanism, an X-ray source 118, a solar slit 120, a spectroscopic device 122, a detector 124, a counter 126, a first control unit 128, and a sensor 130.

The moving mechanism moves the sample 132 between a standby position and a measurement position. The sample 132 may be moved and measured by being placed in a sample holder. Specifically, for example, the moving mechanism includes a robot arm 112 arranged in the preliminary exhaust chamber 104, a turret 114 and a lift 116 arranged in the sample chamber 106, and a controller (not shown) for operating each component.

The controller controls operations of the robot arm 112, the turret 114, and the lift 116 in accordance with instructions of the first control unit 128. In addition, when an abnormality occurs in the operations of the robot arm 112, the turret 114, and the lift 116, or when the movement is completed normally, the controller transmits a signal to that effect to the first control unit 128. The robot arm 112 moves the sample 132, which has been placed by a user at the standby position in the standby chamber 102, between the standby chamber 102 and the preliminary exhaust chamber 104. The turret 114 is, for example, substantially circular in shape, and has holes for each storing the sample 132. When the turret 114 is rotated, the sample 132 is moved between a position directly below the preliminary exhaust chamber 104 and the measurement position. The lift 116 moves the sample 132 up and down. The turret 114 and lift 116 causes the sample 132 to be moved between the preliminary exhaust chamber 104 and the measurement position. Thus, the moving mechanism moves the sample 132 between the standby position and the measurement position. The robot arm 112 may include a chuck mechanism for gripping the sample 132 from above.

The standby position is a space for storing the sample 132 provided in the standby chamber 102. One standby position may be provided, or a plurality of standby positions may be provided inside the standby chamber 102. Meanwhile, the measurement position is a position at which the sample 132 is irradiated with primary X-rays. A measurement environment may be, for example, a vacuum state of $10^{-4}$ Pa or less, an atmospheric state, or a state in which He is introduced.

In addition, when a liquid or powder is measured as it is by such an X-ray fluorescence spectrometer of the tube-below optics type as illustrated in FIG. 1 without pre-processing such as drip drying or press working, the liquid or powder is measured by being placed in, for example, a cylindrical-shaped sample holder having a lower surface covered with a film.

In the following description, not only measurement targets including a liquid and powder to be measured, but also the sample holders in which the liquid and powder are placed, are referred to as "samples 132." As the film, a film made of an extremely thin resin is used in order to efficiently allow X-rays to transmit therethrough.

The X-ray source 118 irradiates the sample 132 with primary X-rays. The X-ray source 118 may include an X-ray shutter between a primary X-ray emitting port and the measurement position. The X-ray shutter is made of a material that does not transmit primary X-rays therethrough, and opens or closes in accordance with an instruction from cut-off means 304. When the X-ray shutter is closed, the generated primary X-rays are not applied to the sample 132.

The solar slit 120 causes the generated fluorescent X-rays to become a parallel flux, and limits an angle of the fluorescent X-rays entering the spectroscopic device 122.

The spectroscopic device 122 spectrally disperses fluorescent X-rays. Specifically, for example, the spectroscopic device 122 spectrally disperses fluorescent X-rays having a specific wavelength that satisfies Bragg's conditional expression among fluorescent X-rays having a plurality of wavelengths, which have been generated from the sample 132.

The detector 124 measures an intensity of entering fluorescent X-rays. Specifically, examples of the detector 124 include a proportional counter tube and a scintillation counter tube, which have hitherto been known. The detector 124 and the spectroscopic device 122 are driven by a scanning mechanism (for example, a goniometer) (not shown). The scanning mechanism changes an incident angle at which the fluorescent X-rays enter the spectroscopic device 122, and moves the detector 124 in a direction in which the spectrally dispersed fluorescent X-rays exit. The detector 124 measures the intensity of the fluorescent X-rays within an angle range including a peak angle at which a peak of the fluorescent X-rays is observed.

The counter 126 counts a pulse signal which is output as a measurement intensity of the detector 124 based on a pulse height, and outputs the pulse signal as a fluorescent X-ray intensity to a control unit.

The sensor 130 detects whether or not the sample 132 is present at the standby position, and transmits the detected sensor signal to the first control unit 128. Specifically, for example, the sensor 130 is an infrared sensor, which is arranged in the standby chamber 102, and detects whether or not the sample 132 is present at the standby position. The sensor 130 transmits the detected sensor signal to the first control unit 128.

The first control unit 128 controls an operation of each component included in the measuring unit 100. Specifically, for example, the first control unit 128 is a board for control on which a microcontroller, a ROM, and other components are mounted. An FPGA may be mounted on the board for control in place of the microcontroller. The first control unit 128 is operated by the microcontroller reading firmware stored in the ROM.

The first control unit 128 gives an instruction to each of the components (including the moving mechanism, the X-ray source 118, and the detector 124) of the measuring unit 100, to thereby control the operation of the each of the components (including the moving mechanism, the X-ray source 118, and the detector 124) of the measuring unit 100. In addition, when an abnormality occurs in each component, the first control unit 128 receives an error signal from a portion in which the abnormality has occurred. For example, an error signal is received from the X-ray source 118 when an abnormal current flows through a tube bulb of the X-ray source 118, and an error signal is received from the moving mechanism when the shutter does not open normally and hence the moving mechanism does not operate normally.

Figure 3:
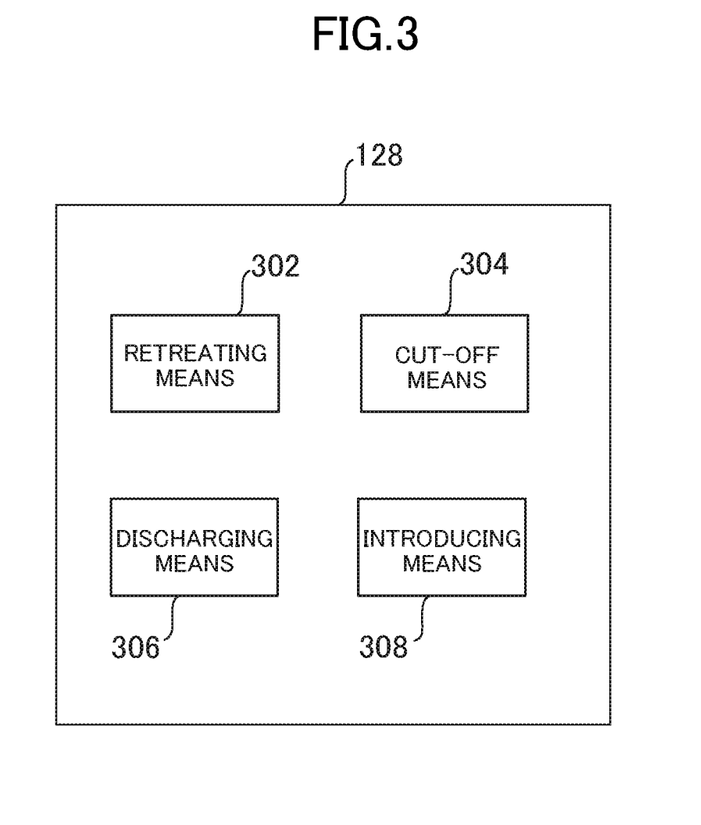
FIG. 3 is an example of a functional block diagram of a first control unit.

As illustrated in FIG. 3, the first control unit 128 includes retreating means 302, cut-off means 304, discharging means 306, and introducing means 308. Specifically, the retreating means 302 performs retreat control for causing the moving mechanism to retreat the sample 132 that is present at the measurement position to the standby position when communication between the first control unit 128 and a second control unit 204 is interrupted. The cut-off means 304 performs cut-off control for cutting off the primary X-rays emitted from the X-ray source 118 when the communication is interrupted. The discharging means 306 performs discharge control for discharging an atmosphere from the sample chamber 106 for measuring the sample 132 to place the measurement position under the measurement environment. The introducing means 308 performs introduction control for introducing the atmosphere into the sample chamber 106 when the communication is interrupted.

Each means included in the first control unit 128 is implemented by, for example, the microcontroller executing the firmware stored in the ROM included in the first control unit 128. The first control unit 128 may have some of the retreating means 302, the cut-off means 304, the discharging means 306, and the introducing means 308 omitted. Details of each means are described later.

The information processing unit 202 includes the second control unit 204, an analysis unit 206, a display unit 208, an input unit 210, a communication unit 212, and a storage unit 214. The information processing unit 202 is, for example, a personal computer, and communicates with the measuring unit 100.

The second control unit 204 controls the measuring unit 100 by communicating with the first control unit 128. The second control unit 204 also transmits to the first control unit 128 a confirmation signal to be used for confirming whether or not the communication is being performed normally at a predetermined time interval. Specifically, for example, the second control unit 204 is a central processing unit (CPU), and executes an application relating to analysis of the sample 132, which is read from the storage unit 214.

At this time, the second control unit 204 transmits and receives signals and data with the first control unit 128 through intermediation of the communication unit 212. The signals to be transmitted by the second control unit 204 to the first control unit 128 include the confirmation signal to be used for confirming whether or not the communication is being performed normally. The second control unit 204 transmits the confirmation signal to the first control unit 128 at a predetermined time interval (for example, every 5 minutes).

The analysis unit 206 analyzes the sample 132 based on the intensity of the fluorescent X-rays measured by the detector 124. Specifically, the analysis unit 206 analyzes an element included in the sample 132 by a known analysis method based on the intensity of the fluorescent X-rays measured by the detector 124.

The display unit 208 is, for example, a liquid crystal display or a cathode ray tube (CRT), and displays an analysis result and other information. The input unit 210 is a keyboard or a mouse, and receives input from the user. The communication unit 212 is a communication interface, for example, a network interface or a USB port, and communicates with the measuring unit 100 through wired or wireless communication. The storage unit 214 is a random access memory (RAM) or a hard disk drive (HDD), and stores an application relating to the analysis and a program required for the information processing unit 202 to operate. The components included in the information processing unit 202 are connected to one another by a data bus 216 so as to exchange electric signals with one another. The hardware configuration of the information processing unit 202 described above is merely an example, and other configurations may be employed.

Figure 4:
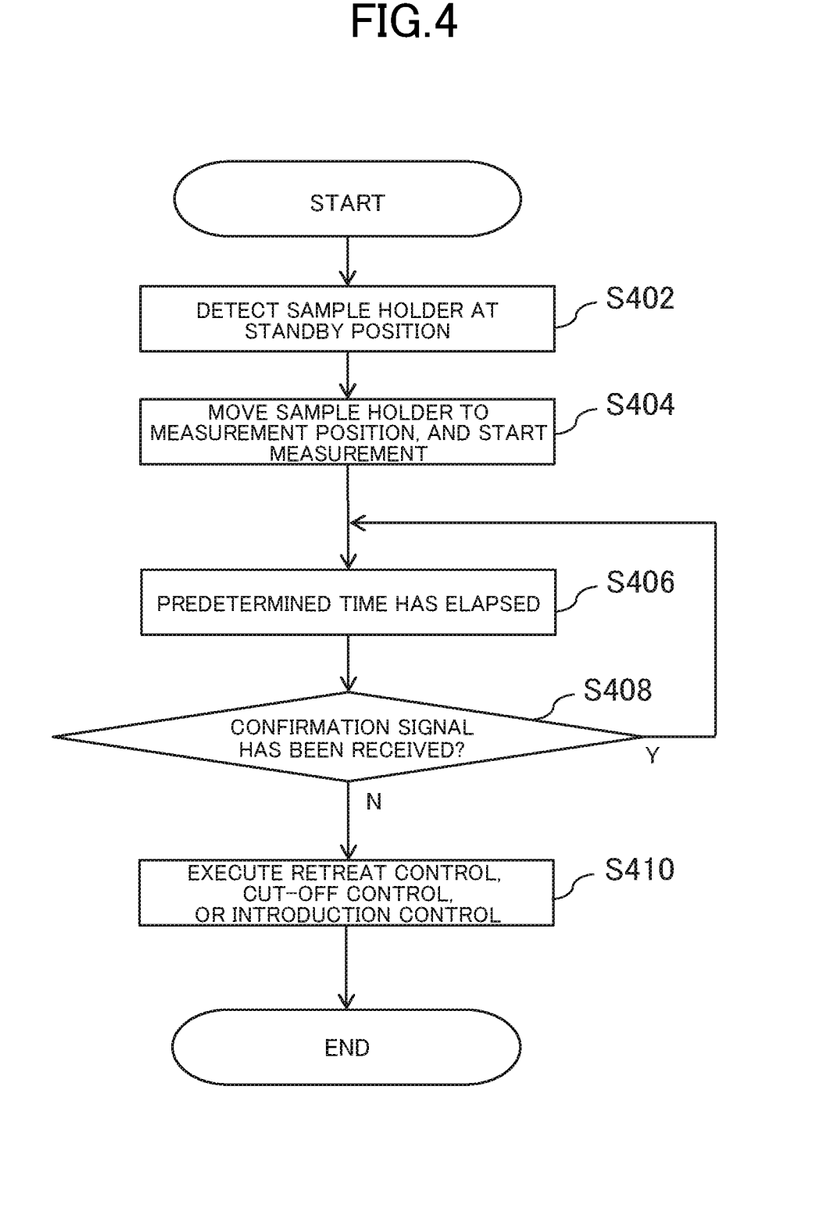
FIG. 4 is a flow chart for illustrating an example of a control method for the X-ray fluorescence spectrometer.

Next, a control method for the X-ray fluorescence spectrometer 200 according to this embodiment, and the details of each means included in the first control unit 128, are described. FIG. 4 is a flow chart for illustrating a control method for the X-ray fluorescence spectrometer 200 according to this embodiment. It is assumed that, before start of this flow, the sample 132 to be analyzed has been placed at the standby position. It is also assumed that the measuring unit 100 has a plurality of standby positions in the standby chamber 102 and is configured so that a plurality of samples 132 may be simultaneously present inside the measuring unit 100.

First, the sensor 130 detects whether or not the sample 132 is present at the standby position, and transmits the detected sensor signal to the first control unit 128 (Step S402).

Subsequently, the sample 132 is moved to the measurement position, and the measuring unit 100 starts the measurement (Step S404). Specifically, the sample 132 present at the standby position is moved by the robot arm 112 to the preliminary exhaust chamber 104 open to the atmosphere. After that, the shutter between the preliminary exhaust chamber 104 and the standby chamber 102 is closed. The discharging means 306 transmits an instruction to a pump (not shown) to discharge the atmosphere from the preliminary exhaust chamber 104. Thus, the atmosphere is discharged from the preliminary exhaust chamber 104. After the preliminary exhaust chamber 104 is brought into a vacuum state by the pump, the sample 132 present in the preliminary exhaust chamber 104 is moved by the lift 116 to the hole of the turret 114 arranged in the sample chamber 106. Subsequently, rotation of the turret 114 causes the sample 132 to be moved to the measurement position. In addition, the X-ray source 118 irradiates the sample 132 arranged at the measurement position with the primary X-rays. Fluorescent X-rays are generated from the sample 132 irradiated with the primary X-rays, and hence the detector 124 starts to measure the intensity of the fluorescent X-rays.

The first control unit 128 may perform control for introducing He into the sample chamber 106 before the measurement is performed, to thereby cause the measurement to be performed under a He atmosphere. Specifically, for example, the introducing means 308 may introduce He into the sample chamber after the sample chamber 106 is brought into a vacuum state, or may introduce He into the sample chamber 106 at the same time as the discharging means 306 discharges the atmosphere. The introducing means 308 may also spray He in the vicinity of the sample 132 (for example, on an optical path of the primary X-rays) at the time of the measurement (so-called He flush). In addition, when the measurement is performed under an atmospheric environment, the discharging means 306 does not perform the discharge control.

Subsequently, when a predetermined time elapses (Step S406), the first control unit 128 determines whether or not the confirmation signal has been received (Step S408). Specifically, for example, the first control unit 128 determines whether or not the confirmation signal transmitted by the second control unit 204 every 5 minutes has been received. The first control unit 128 determines whether or not the confirmation signal has been received every 5 minutes. When the confirmation signal has been received (Y in Step S408), the first control unit 128 determines that a communication state is normal, and the procedure returns to Step S406. Meanwhile, when the first control unit 128 does not receive the confirmation signal (N in Step S408), the first control unit 128 determines that an abnormality has occurred in the communication state, and the procedure advances to Step S410. A time interval at which the second control unit 204 transmits the confirmation signal and the predetermined time of Step S406 may be the same or may be different from each other.

The confirmation signal may include information indicating whether a state of the information processing unit 202 is normal or abnormal. In this case, the procedure may return from Step S408 to Step S406 when the information included in the confirmation signal indicates that the information processing unit 202 is normal, and the procedure may advance from Step S408 to Step S410 when the information included in the confirmation signal indicates that the information processing unit 202 is abnormal.

Step S406 and Step S408 are repeatedly executed as long as the communication state is normal. That is, when the first control unit 128 determines that an abnormality has occurred in the communication state, Step S410 is executed. When an abnormality occurs in the communication state, the first control unit 128 may be unable to acquire a new instruction from the second control unit 204. In this case, there is a fear that the sample 132 may be continuously irradiated with the primary X-rays. When the sample 132 is continuously irradiated with the primary X-rays, a bulk-shaped sample 132 may be burnt, or a liquid or powder sample 132 may be scattered. In view of this, the first control unit 128 performs the retreat control, the cut-off control, or the introduction control when the confirmation signal has not been continuously received for a predetermined time.

In Step S410, of the retreat control, the cut-off control, and the introduction control, the control set in advance by the user is preferentially performed. In another case, in Step S410, of the retreat control, the cut-off control, and the introduction control, the control selected by the user may be performed.

Figure 5:
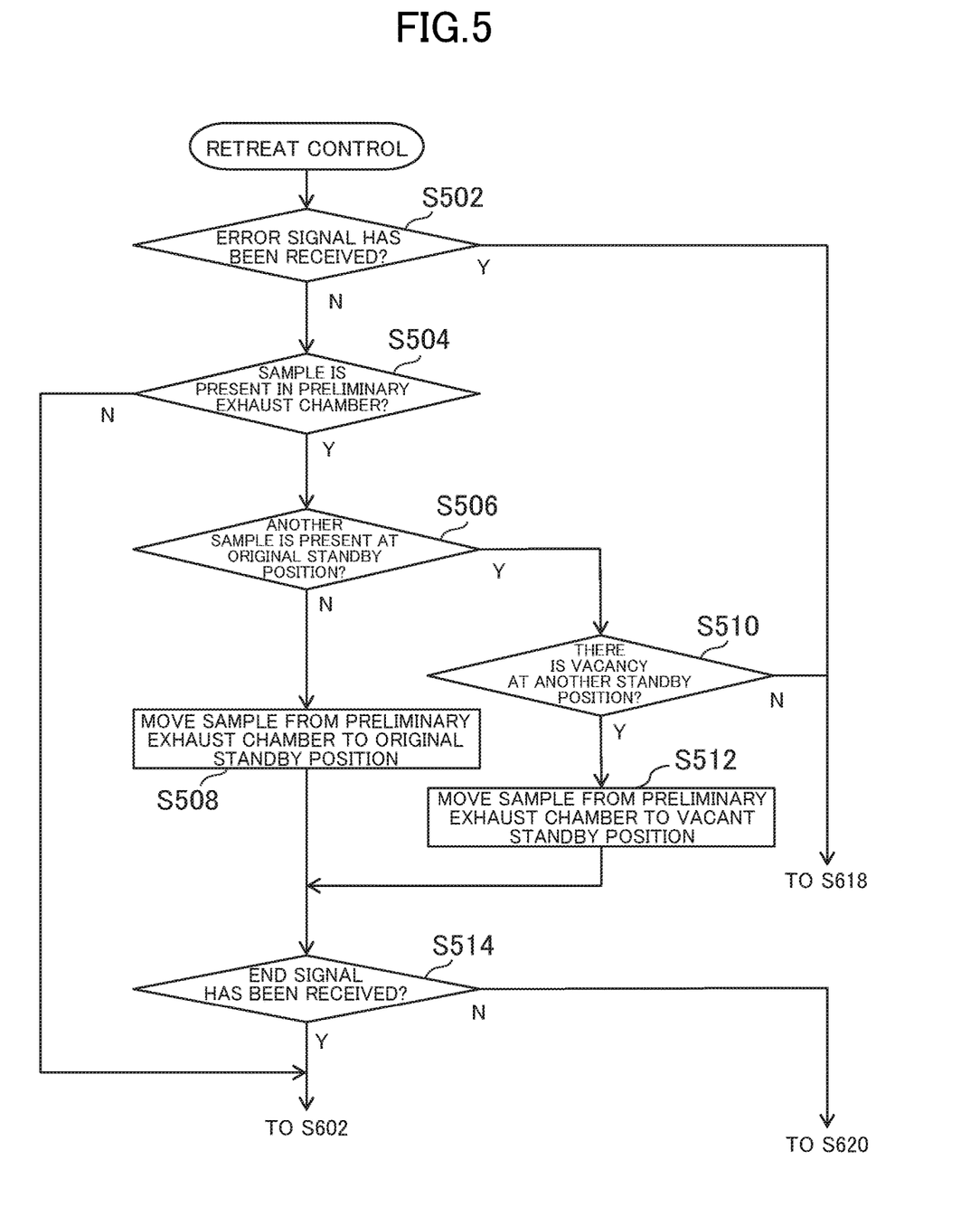
FIG. 5 is a flow chart for illustrating an example of retreat control.
Figure 6:
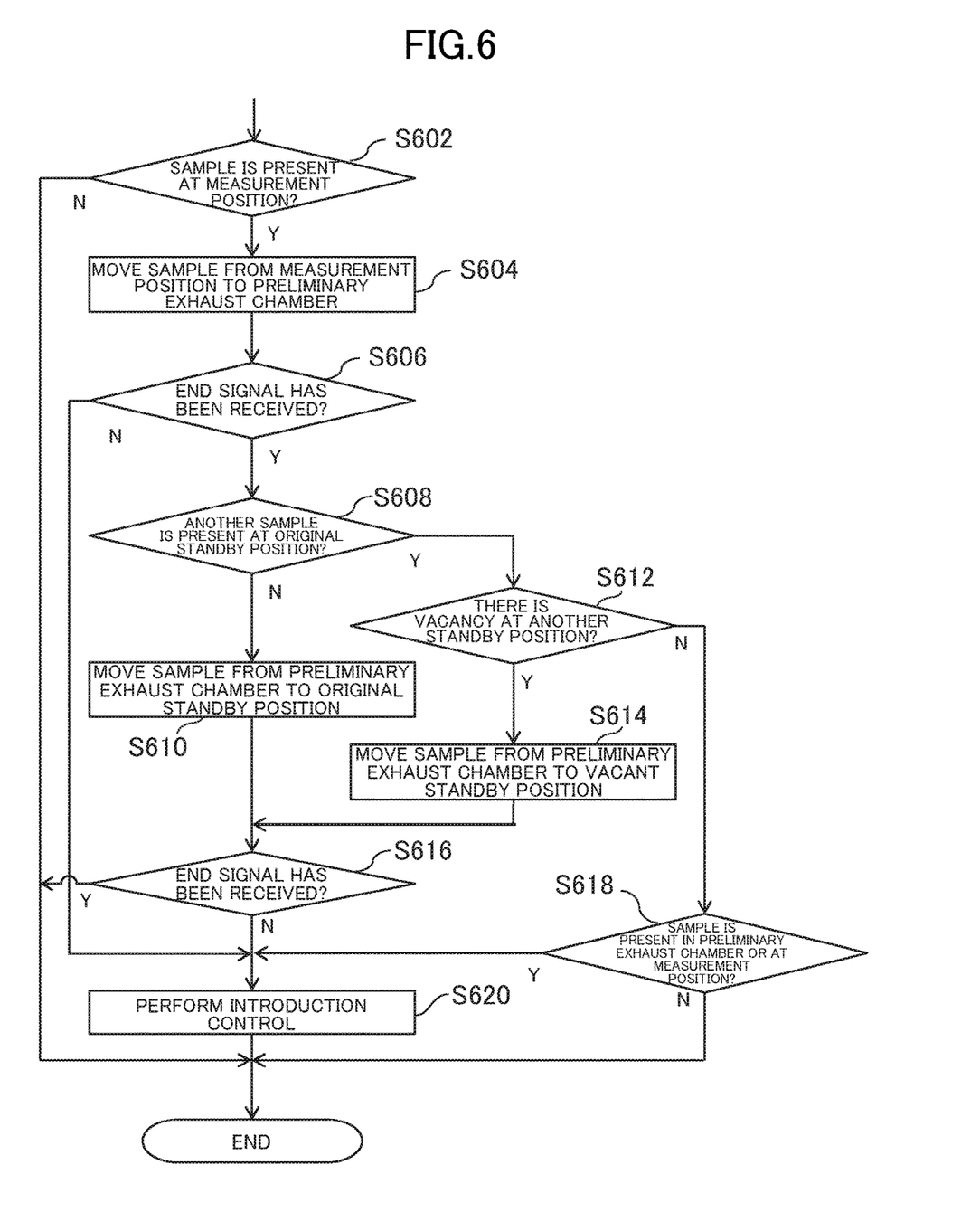
FIG. 6 is a flow chart for illustrating the example of the retreat control.

FIG. 5 and FIG. 6 are flow charts for illustrating the retreat control. When the retreat control is performed in Step S410, the first control unit 128 first determines whether or not an error signal has been received (Step S502). Specifically, for example, when an abnormality has occurred in the X-ray source 118 or the moving mechanism between Step S402 and Step S410, the first control unit 128 has received an error signal. In this case, it may not be possible to move the sample 132 from the measurement position to the standby position, or a failure may occur in the X-ray fluorescence spectrometer 200. Consequently, when the first control unit 128 has received an error signal in Step S502, the procedure advances to Step S618. Meanwhile, when the first control unit 128 has not received an error signal, the procedure advances to Step S504.

When the first control unit 128 has not received an error signal, the first control unit 128 determines whether or not the sample 132 is present in the preliminary exhaust chamber 104 (Step S504). Specifically, for example, when the sensor 130 is arranged in the preliminary exhaust chamber 104, the first control unit 128 determines whether or not the sample 132 is present in the preliminary exhaust chamber 104 based on the sensor signal. When the sensor 130 is provided only in the standby chamber 102, the first control unit 128 may manage a flag indicating whether or not the sample 132 is present in the preliminary exhaust chamber 104 based on the operation of the moving mechanism, to thereby determine whether or not the sample 132 is present in the preliminary exhaust chamber 104. The following description is given on the assumption that the first control unit 128 determines whether or not the sample 132 is present at each position based on output from the sensor.

When it is determined in Step S504 that the sample 132 is present in the preliminary exhaust chamber 104, the first control unit 128 determines whether or not another sample 132 is present at the standby position at which the sample 132 is placed before start of the measurement (hereinafter referred to as "original standby position") (Step S506). Specifically, for example, the first control unit 128 determines whether or not another sample 132 is present at the standby position at which the sample 132 was placed in Step S402 among the plurality of standby positions provided in the standby chamber 102. When a plurality of standby positions are provided, the user may appropriately place a new sample 132 at the standby position to continuously analyze the plurality of samples 132. At this time, while the sample 132 is being measured, the user may arrange another sample 132 at the original standby position to prepare for the next measurement. In such a case, another sample 132 is present at the original measurement position, and hence the first control unit 128 determines that another sample 132 is present at the original standby position.

When it is determined that another sample 132 is not present at the original standby position, the retreating means 302 instructs the moving mechanism to move the sample 132 present in the preliminary exhaust chamber 104 to the original standby position (Step S508). Meanwhile, when it is determined that another sample 132 is present at the original position, the first control unit 128 determines whether or not there is a vacancy at another standby position in the standby chamber 102 (Step S510). When it is determined that there is a vacancy at another standby position, the retreating means 302 instructs the moving mechanism to move the sample 132 present in the preliminary exhaust chamber 104 to the standby position determined to be vacant (Step S512). When it is determined that there is no vacant standby position (that is, when the samples 132 are present at all the standby positions), the procedure advances to Step S618 while the sample 132 is held in the preliminary exhaust chamber 104.

In Step S508 and Step S512, when the movement of the sample 132 is completed normally, the movement mechanism transmits an end signal indicating that the movement has been completed normally to the first control unit 128. In Step S514, when the first control unit 128 receives the end signal, the procedure advances to Step S602, and when the first control unit 128 does not receive the end signal within a predetermined time, the procedure advances to Step S620.

When the first control unit 128 receives the end signal in Step S514, the first control unit 128 determines whether or not the sample 132 is present at the measurement position (Step S602). Specifically, in the same manner as in Step S504, the first control unit 128 determines whether or not the sample 132 is present by managing the output signal from a sensor arranged in the sample chamber 106 or the above-mentioned flag. When the sample 132 is not present at the measurement position, the sample 132 is not continuously irradiated with the primary X-rays, and hence the retreat control is ended. Meanwhile, when the sample 132 is present at the measurement position, the retreating means 302 instructs the moving mechanism to move the sample 132 present at the measurement position to the preliminary exhaust chamber 104 (Step S604).

When the movement of the sample 132 is completed normally, the moving mechanism transmits the end signal indicating that the movement has been completed normally to the first control unit 128. In Step S606, when the first control unit 128 receives the end signal, the procedure advances to Step S608, and when the first control unit 128 does not receive the end signal within a predetermined time, the procedure advances to Step S620.

When the first control unit 128 receives the end signal in Step S606, the sample 132 is present in the preliminary exhaust chamber 104. The retreating means 302 performs processing for moving the sample 132 present in the preliminary exhaust chamber 104 to the standby position (from Step S608 to Step S616). The processing performed from Step S608 to Step S616 is the same as the processing performed from Step S506 to Step S514.

When an error signal is received in Step S502, and when it is determined in Step S510 or Step S612 that there is no vacancy at the standby position, the first control unit 128 determines whether or not the sample 132 is present in the preliminary exhaust chamber 104 or at the measurement position (Step S618). When the sample 132 is present either in the preliminary exhaust chamber 104 or at the measurement position, the procedure advances to Step S620, and when the sample 132 is not present, the sample 132 is not continuously irradiated with the primary X-rays, and hence the retreat control is ended.

Figure 7:
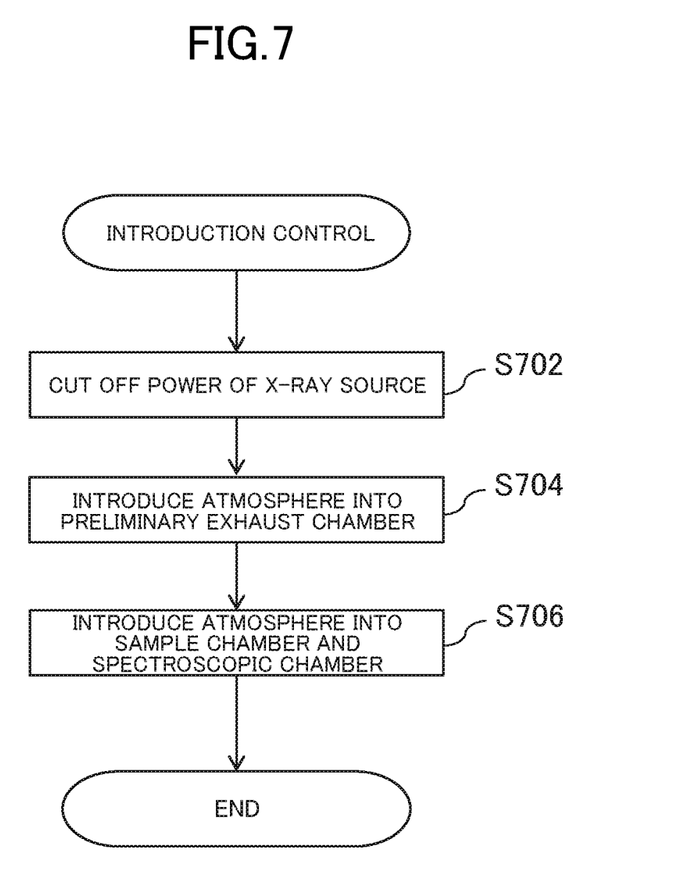
FIG. 7 is a flow chart for illustrating an example of introduction control.

Step S620 is a state in which the sample 132 is present inside the measuring unit 100 and the sample 132 may continue to be irradiated with the primary X-rays. In view of this, in Step S620, the introduction control is performed by the introducing means 308. FIG. 7 is a flow chart for illustrating the introduction control. The introduction control is executed when the first control unit 128 receives an error signal and the sample 132 is present in the preliminary exhaust chamber 104 or at the measurement position (Y in Step S618), or when the retreating means 302 gives the instruction to move the sample 132 but fails to move the sample 132 normally (N in Step S514, Step S606, or Step S616). The introduction control is also executed when the introduction control is selected by the user in Step S410 or when the introduction control has been set in advance to be performed in Step S410.

First, power of the X-ray source 118 is cut off (Step S702). Specifically, the cut-off means 304 transmits a signal indicating that the power is to be cut off to the X-ray source 118. The X-ray source 118 that has received the signal sets a voltage being applied to the tube bulb to 0 V. Thus, the X-ray source 118 stops generating primary X-rays. When the X-ray source 118 includes the X-ray shutter, the cut-off means 304 may instruct the X-ray source 118 to close the X-ray shutter. Thus, the primary X-rays being applied to the sample 132 are cut off.

Subsequently, the first control unit 128 introduces the atmosphere into the preliminary exhaust chamber 104 (Step S704). Specifically, the first control unit 128 introduces the atmosphere into the preliminary exhaust chamber 104 by performing control for opening a valve (not shown) connected to the preliminary exhaust chamber 104.

Subsequently, the first control unit 128 introduces the atmosphere into the sample chamber 106 and the spectroscopic chamber 110 (Step S706). Specifically, the first control unit 128 introduces the atmosphere into the preliminary exhaust chamber 104 by performing control for opening a valve (not shown) connected to the sample chamber 106 and the spectroscopic chamber 110.

When the cut-off control is performed in Step S410, only Step S702 is performed. That is, the first control unit 128 transmits to the X-ray source 118 the signal indicating that the power is to be cut off, and the flow illustrated in FIG. 4 is ended.

The flows illustrated from FIG. 4 to FIG. 7 are executed, to thereby enable the first control unit 128 to perform the retreat control, the cut-off control, or the introduction control independently of the information processing unit 202 even when an abnormality occurs in the communication between the first control unit 128 and the second control unit 204, or when an abnormality occurs in the inside of the measuring unit 100, for example, in the moving mechanism or the X-ray source 118. Thus, it is possible to prevent deterioration of the sample 132 and contamination inside the measuring unit 100. Meanwhile, when the sample 132 is moved normally to the standby position by performing the retreat control, the inside of the sample chamber 106 and the spectroscopic chamber 110 can be maintained in a vacuum state while the power of the X-ray source 118 is turned on. Thus, when the next measurement is performed, it is not necessary to perform exhaust control of the sample chamber 106 and the spectroscopic chamber 110, or to perform aging of the X-ray source 118, and hence the measurement can be started quickly.

In addition, in accordance with the flows illustrated from FIG. 4 to FIG. 7, it is determined whether or not the sample 132 is present in the preliminary exhaust chamber 104 (Step S504), and after the sample is delivered from the preliminary exhaust chamber 104 (Step S508 or Step S512), it is determined whether or not the sample 132 is present at the measurement position (Step S602). Accordingly, even when a plurality of samples 132 are simultaneously present inside the measuring unit 100, the sample 132 can be safely delivered to the standby position without colliding with another sample 132.

The present invention can be variously modified without being limited to the above-mentioned embodiment. The configuration of the X-ray fluorescence spectrometer 200 described above is described as one example, and the present invention is not limited thereto. The configurations described in the above-mentioned embodiment may be replaced by configurations that are substantially the same as the configurations described in the above-mentioned embodiment, configurations that exhibit the same action and effect as those of the configurations described in the above-mentioned embodiment, or configurations that achieve the same object as that of the configurations described in the above-mentioned embodiment.

Figure 8:
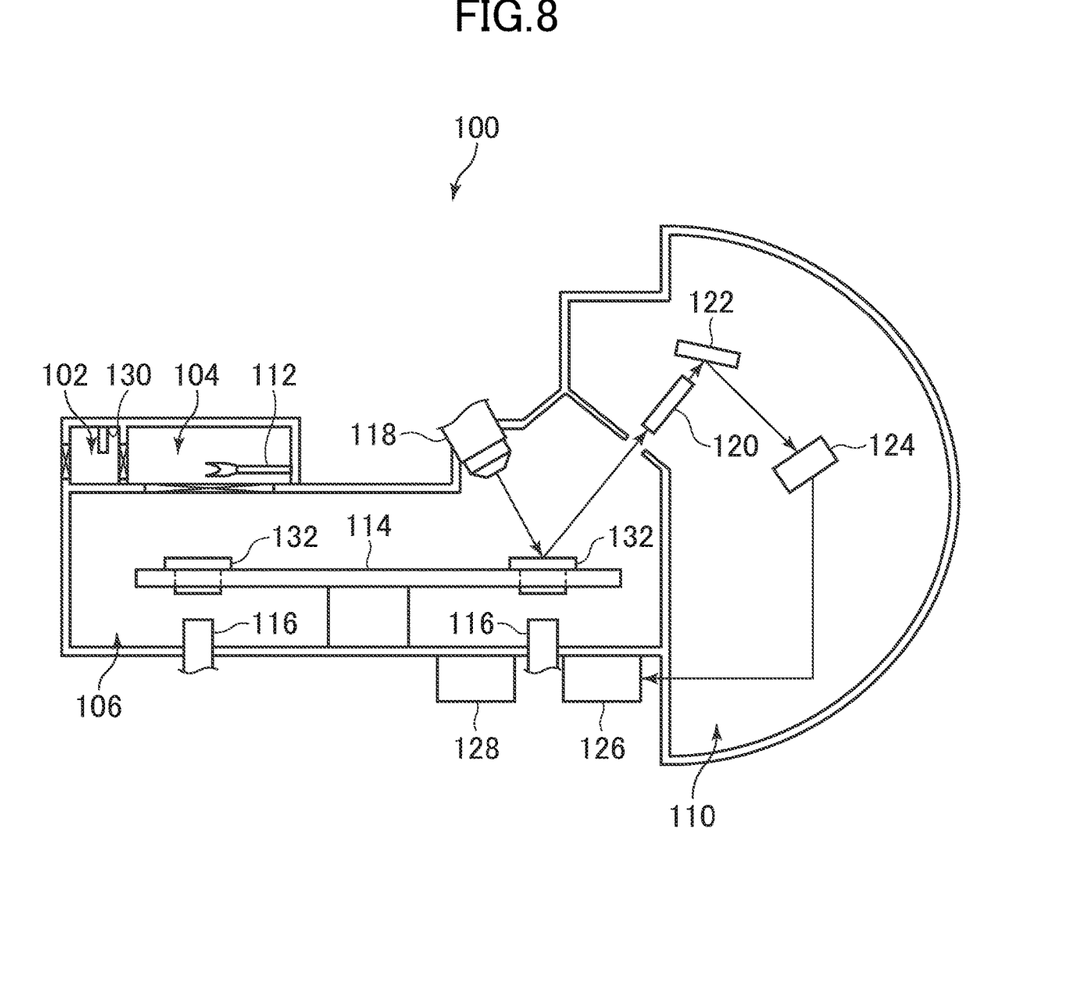
FIG. 8 is a diagram for illustrating a measuring unit in a modification example of the present invention.

Further, for example, FIG. 1 is an illustration of the measuring unit 100 included in the X-ray fluorescence spectrometer 200 of the tube-below optics type in which the lower surface of the sample 132 is irradiated with the primary X-rays, but as illustrated in FIG. 8, the X-ray fluorescence spectrometer 200 may be an X-ray fluorescence spectrometer of a tube-above optics type in which an upper surface of the sample 132 is irradiated with primary X-rays. The X-ray fluorescence spectrometer 200 illustrated in FIG. 8 is different from the X-ray fluorescence spectrometer 200 illustrated in FIG. 1 in that the sample 132 is irradiated with primary X-rays from the upper surface, but the function of each component is the same.

REFERENCE SIGNS LIST 100 measuring unit, 102 standby chamber, 104 preliminary exhaust chamber, 106 sample chamber, 110 spectroscopic chamber, 112 robot arm, 114 turret, 118 X-ray source, 120 solar slit, 122 spectroscopic device, 124 detector, 126 counter, 128 first control unit, 130 sensor, 132 sample, 200 X-ray fluorescence spectrometer, 202 information processing unit, 204 second control unit, 206 analysis unit, 208 display unit, 210 input unit, 212 communication unit, 214 storage unit, 216 data bus, 302 retreating means, 304 cut-off means, 306 discharging means, 308 introducing means

The invention claimed is:
1. An X-ray fluorescence spectrometer, comprising:
a measuring unit including:
a moving mechanism configured to move a sample between a standby position and a measurement position;
an X-ray source configured to irradiate the sample with primary X-rays;
a detector configured to measure an intensity of entering fluorescent X-rays; and
a first control unit configured to control operations of the moving mechanism and the X-ray source; and
an information processing unit including:
an analysis unit configured to analyze the sample based on the intensity of the fluorescent X-rays measured by the detector; and
a second control unit configured to control the measuring unit by communicating with the first control unit,
the first control unit including retreat controller configured to perform retreat control for causing the moving mechanism to retreat the sample present at the measurement position to the standby position when communication between the first control unit and the second control unit is interrupted.

2. The X-ray fluorescence spectrometer according to claim 1,
wherein the second control unit is configured to transmit to the first control unit a confirmation signal to be used for confirming whether the communication is being performed normally at a predetermined time interval, and
wherein, when the confirmation signal has not been continuously received for a predetermined time, the first control unit is configured to determine that the communication has been interrupted, and to perform the retreat control.

3. The X-ray fluorescence spectrometer according to claim 1, wherein the first control unit includes cut-off controller configured to perform cut-off control for cutting off the primary X-rays emitted from the X-ray source when the communication is interrupted.

4. The X-ray fluorescence spectrometer according to claim 1, wherein the first control unit includes:
discharge controller configured to perform discharge control for discharging an atmosphere from a sample chamber for measuring the sample to place the measurement position under a measurement environment; and
introduction controller configured to perform introduction control for introducing the atmosphere into the sample chamber when the communication is interrupted.

5. A control method for an X-ray fluorescence spectrometer,
the X-ray fluorescence spectrometer including:
a measuring unit including:
a moving mechanism configured to move a sample between a standby position and a measurement position;
an X-ray source configured to irradiate the sample with primary X-rays;
a detector configured to measure an intensity of entering fluorescent X-rays; and
a first control unit configured to control operations of the moving mechanism and the X-ray source; and
an information processing unit including:
an analysis unit configured to analyze the sample based on the intensity of the fluorescent X-rays measured by the detector; and
a second control unit configured to control the measuring unit by communicating with the first control unit,
the control method comprising the steps of:
confirming whether communication between the first control unit and the second control unit has been interrupted; and performing retreat control for causing the moving mechanism to retreat the sample present at the measurement position to the standby position when it is confirmed that the communication has been interrupted.

* * * * *